(12) United States Patent
Tamura et al.

(10) Patent No.: US 11,090,556 B2
(45) Date of Patent: Aug. 17, 2021

(54) ENTERTAINMENT DEVICE, DISPLAY CONTROL METHOD, PROGRAM, AND INFORMATION STORAGE MEDIUM

(71) Applicant: SONY INTERACTIVE ENTERTAINMENT INC., Tokyo (JP)

(72) Inventors: Keigo Tamura, Tokyo (JP); Tomoki Takaichi, Tokyo (JP); Masaki Higuchi, Tokyo (JP); Toshimasa Aoki, Tokyo (JP); Ikuo Kobayashi, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 758 days.

(21) Appl. No.: 15/032,386

(22) PCT Filed: Nov. 4, 2014

(86) PCT No.: PCT/JP2014/079255
§ 371 (c)(1),
(2) Date: Apr. 27, 2016

(87) PCT Pub. No.: WO2015/068699
PCT Pub. Date: May 14, 2015

(65) Prior Publication Data
US 2016/0271490 A1    Sep. 22, 2016

(30) Foreign Application Priority Data

Nov. 8, 2013    (JP) .............................. JP2013-232597

(51) Int. Cl.
*A63F 13/215*    (2014.01)
*G10L 15/22*    (2006.01)
(Continued)

(52) U.S. Cl.
CPC .......... *A63F 13/215* (2014.09); *A63F 13/424* (2014.09); *A63F 13/48* (2014.09);
(Continued)

(58) Field of Classification Search
CPC ......... A63F 13/20; A63F 13/21; A63F 13/215
See application file for complete search history.

(56) References Cited

U.S. PATENT DOCUMENTS 8,237,041 B1 *  8/2012  McCauley ........... G10H 1/0091
                                                84/610
2003/0128211 A1    7/2003  Watanabe et al.
(Continued)

FOREIGN PATENT DOCUMENTS

JP        6-259091 A     9/1994
JP      2001-042891 A    2/2001
(Continued)

OTHER PUBLICATIONS

International Search Report dated Jan. 13, 2015, from the corresponding PCT/JP2014/079255.
(Continued)

*Primary Examiner* — James S. McClellan
(74) *Attorney, Agent, or Firm* — Katten Muchin Rosenman LLP

(57) ABSTRACT

There are provided an entertainment device, a display control method, a program, and an information storage medium for enabling command information arranged on a screen to be less of a nuisance for the user than before. A voice receiving section (56) receives a voice. When the voice represents prescribed information, a command information arranging section (68) arranges command information at a position on a screen in accordance with display content of the screen, the command information being indicative of a command and causing execution of a process corresponding to the command upon receipt of the voice represented by the information.

7 Claims, 15 Drawing Sheets

(51) Int. Cl.
    *A63F 13/533*     (2014.01)
    *A63F 13/424*     (2014.01)
    *A63F 13/48*     (2014.01)
    *G06F 3/16*     (2006.01)

(52) U.S. Cl.
    CPC ............ *A63F 13/533* (2014.09); *G06F 3/167* (2013.01); *G10L 15/22* (2013.01); *G10L 2015/223* (2013.01)

(56) References Cited

U.S. PATENT DOCUMENTS

| | | | | |
|---|---|---|---|---|
| 2004/0123320 A1* | 6/2004 | Daily | ................ | H04N 5/44543 |
| | | | | 725/61 |
| 2012/0122577 A1* | 5/2012 | Aronzon | ............... | G06F 3/0489 |
| | | | | 463/36 |
| 2012/0316780 A1* | 12/2012 | Huth | ..................... | G01C 21/36 |
| | | | | 701/450 |

FOREIGN PATENT DOCUMENTS

| | | |
|---|---|---|
| JP | 2003-227729 A | 8/2003 |
| JP | 2013-54074 A | 3/2013 |

OTHER PUBLICATIONS

Notification of Reason for Refusal dated Jun. 20, 2017, from the corresponding Japanese Patent Application No. 2015-546646.

\* cited by examiner

FIG. 3B
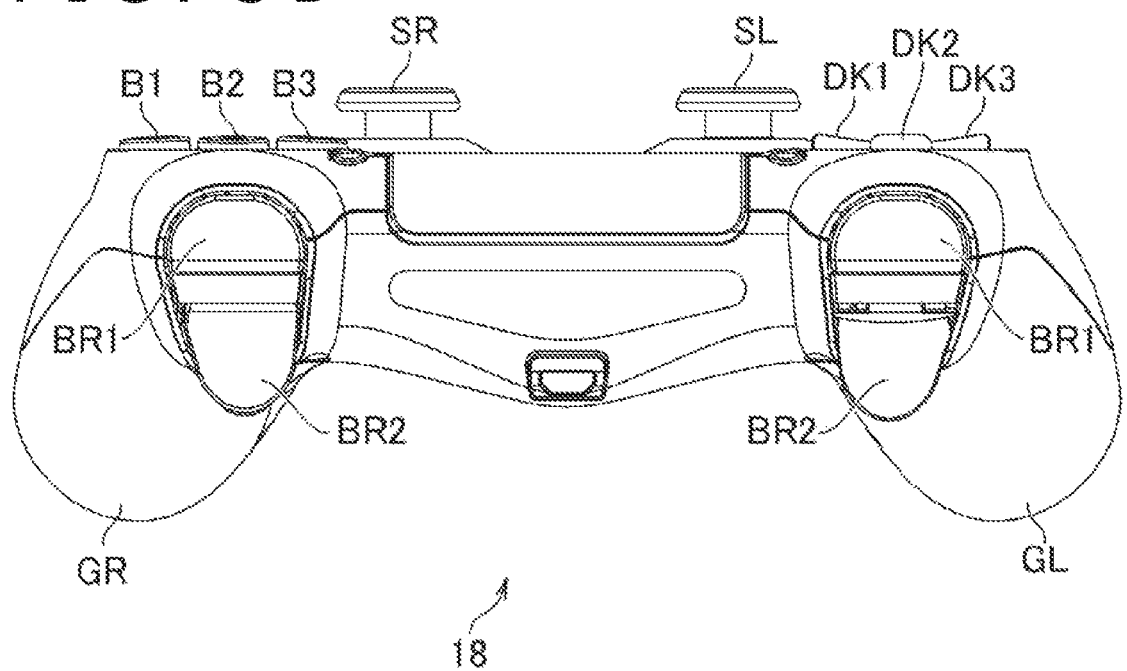
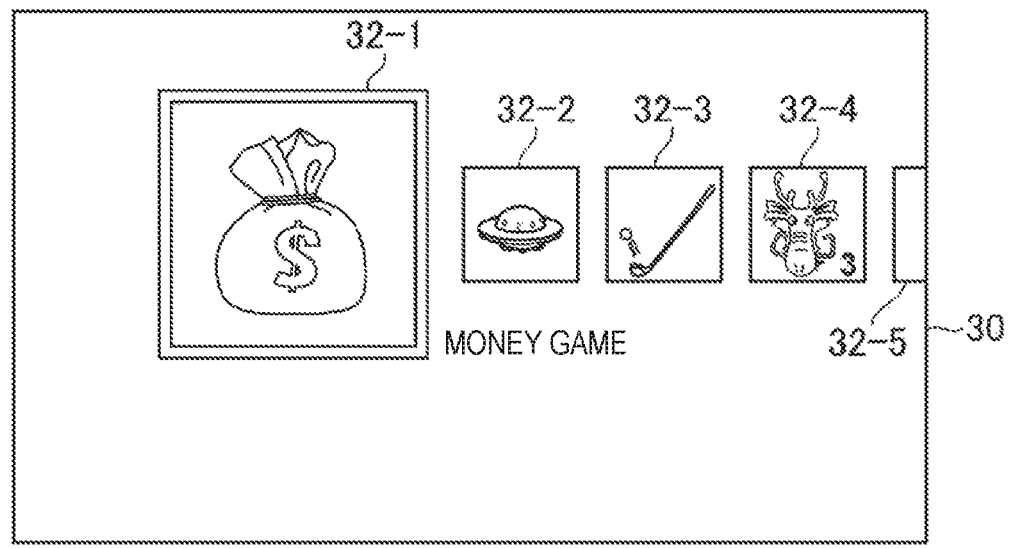
FIG. 4

FIG. 9

| PROGRAM ID | PROGRAM NAME DATA | VENDOR NAME DATA | VOICE COMMAND DATA | | | LAST PLAY DATE AND TIME DATA |
|---|---|---|---|---|---|---|
| | | | FIRST VOICE COMMAND DATA | SECOND VOICE COMMAND DATA | THIRD VOICE COMMAND DATA | |
| 025 | DRAGON GAME 3 | A | 'DRAGON GAME' | 'DG' | 'DRAGON GAME THREE' | 2013/9/6 16:15:30 |
| 013 | DRAGON GAME 2 | A | 'DRAGON GAME' | 'DG' | 'DRAGON GAME TWO' | 2012/7/5 15:36:15 |
| 012 | MUSIC PANIC | B | 'MUSIC PANIC' | 'MP' | 'MUSIC' | 2013/9/10 19:20:36 |

FIG.10

| VOICE COMMAND DATA | PROCESS CONTENT DATA |
|---|---|
| 'START' | EXECUTE SELECTED PROGRAM |
| 'POWER' | TRANSITION TO POWER CONTROL SCREEN |
| 'TAKE SCREEN SHOT' | CAPTURE IMAGE |
| 'LOG IN' | TRANSITION TO USER SELECTION SCREEN |
| 'DRAGON GAME' | FIRST PRIORITY: IDENTIFY PROGRAM ICON IMAGE 32-4 AS OPTION OF INTEREST |
| 'DG' | SECOND PRIORITY: IDENTIFY PROGRAM ICON IMAGE 32-4 AS ALTERNATIVE OPTION |
| 'DRAGON GAME THREE' | |
| 'DRAGON GAME' | FIRST PRIORITY: IDENTIFY PROGRAM ICON IMAGE 32-7 AS OPTION OF INTEREST |
| 'DG' | SECOND PRIORITY: IDENTIFY PROGRAM ICON IMAGE 32-7 AS ALTERNATIVE OPTION |
| 'DRAGON GAME TWO' | |
| 'MUSIC PANIC' | FIRST PRIORITY: IDENTIFY PROGRAM ICON IMAGE 32-5 AS OPTION OF INTEREST |
| 'MP' | SECOND PRIORITY: IDENTIFY PROGRAM ICON IMAGE 32-5 AS ALTERNATIVE OPTION |
| 'MUSIC' | |

| VOICE COMMAND DATA | PROCESS CONTENT DATA |
|---|---|
| 'HOME SCREEN' | TRANSITION TO HOME SCREEN |
| 'TAKE SCREEN SHOT' | CAPTURE IMAGE |
| 'LOG IN' | TRANSITION TO USER SELECTION SCREEN |

FIG.20

| DISPLAY CONTENT | POSITION | SIZE | ARRANGED CONTENT |
|---|---|---|---|
| HOME SCREEN | (x1,y1) | (a1,b1) | ⓒ START   ⓒ POWER   ⋯ |
| PLAY SCREEN (EXCEPT FOR SCENE WHERE DRAGON IS DISPATCHED) | (x2,y2) | (a2,b2) | TO RETURN TO HOME SCREEN, ⋯ |
| PLAY SCREEN (SCENE WHERE DRAGON IS DISPATCHED) | (x3,y3) | (a3,b2) | TO TAKE SCREEN SHOT, ⋯ |

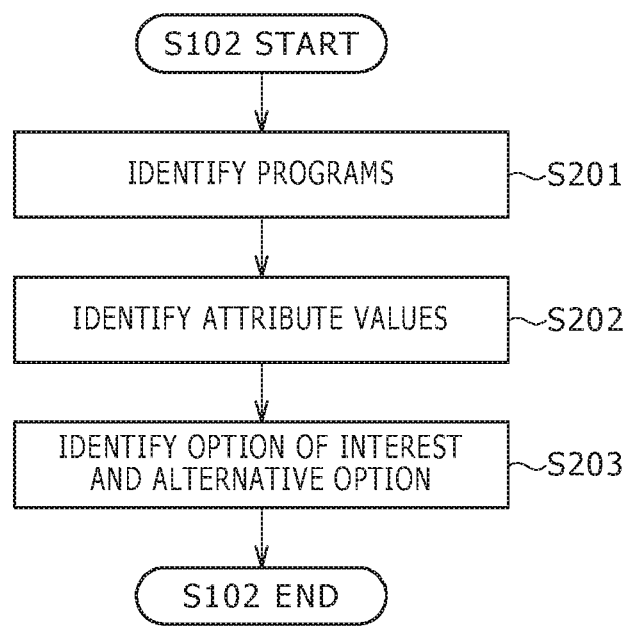

ENTERTAINMENT DEVICE, DISPLAY CONTROL METHOD, PROGRAM, AND INFORMATION STORAGE MEDIUM

TECHNICAL FIELD

The present invention relates to an entertainment device, a display control method, a program, and an information storage medium.

BACKGROUND ART

Technology exists which allows a voice input by a user to be received and which executes a process corresponding to the information represented by the received voice. A typical device utilizing the technology displays command information such as a phrase representative of a command when recognizing, by known voice recognition technology, that the received voice represents prescribed information such as what is known as magic word. Upon receipt of the voice described by the command information, this type of device executes the process corresponding to the command indicated by the command information.

SUMMARY

Technical Problem

When the received voice represents the prescribed information, techniques known in the art are used to arrange the command information to be displayed at a predetermined position on the screen regardless of display content of the screen. The command information thus arranged on the screen can be a nuisance for the user if important information is displayed at the position where the command information is arranged.

The present invention has been made in view of the above circumstances. An object of the invention is to provide an entertainment device, a display control method, a program, and an information storage medium for enabling command information arranged on the screen to be less of a nuisance for the user than before.

Solution to Problem

In solving the above problem and according to the present invention, there is provided an entertainment device including: a voice receiving section configured to receive a voice; and a command information arranging section configured such that when the voice represents prescribed information, the command information arranging section arranges command information at a position on a screen in accordance with display content of the screen, the command information being indicative of a command and causing execution of a process corresponding to the command upon receipt of the voice represented by the information.

According to the present invention, there is provided a display control method including: a step of receiving a voice; and a step of, when the voice represents prescribed information, arranging command information at a position on a screen in accordance with display content of the screen, the command information being indicative of a command and causing execution of a process corresponding to the command upon receipt of the voice represented by the information.

According to the present invention, there is provided a program for causing a computer to perform: a sequence of receiving a voice; and a sequence of, when the voice represents prescribed information, arranging command information at a position on a screen in accordance with display content of the screen, the command information being indicative of a command and causing execution of a process corresponding to the command upon receipt of the voice represented by the information.

According to the present invention, there is provided a computer-readable information storage medium which stores a program for causing a computer to perform: a sequence of receiving a voice; and a sequence of, when the voice represents prescribed information, arranging command information at a position on a screen in accordance with display content of the screen, the command information being indicative of a command and causing execution of a process corresponding to the command upon receipt of the voice represented by the information.

According to the present invention, there is provided another entertainment device including: a voice receiving section configured to receive a voice; a voice command recognizing section configured to recognize a specific voice command from voice data acquired by the voice receiving section; and a display controlling section configured such that when the specific voice command is recognized during display of a first screen, the display controlling section causes display of a first menu including at least one voice command, and the display controlling section further causing display of a second menu including at least one voice command when the voice command is recognized during display of a second screen.

Preferably, the entertainment device may further include a process executing section configured to execute the process corresponding to the command indicated by the command information when the voice received by the voice receiving section represents the command information. The command information arranging section may have control over whether or not to arrange the command information in accordance with the display content of the screen. Regardless of whether or not the command information is arranged, the process executing section may execute the process corresponding to the command indicated by the command information when the voice received by the voice receiving section represents the command information.

In the preceding preferred embodiment, the command information arranging section may have control over whether or not to arrange each of a plurality of pieces of the command information in accordance with the display content of the screen. When the voice received by the voice receiving section represents one of the pieces of the command information, the process executing section may execute the process corresponding to the command indicated by the piece of the command information.

Preferably, one of the pieces of the command information may be the command information indicating the command for capturing the display content of the screen.

Preferably, the command information arranging section may hide a screen area of the display content varying in size depending on the display content of the screen and arrange the command information in the area.

In the preceding preferred embodiment, when a game play screen is displayed, the command information arranging section may hide a screen area of the display content smaller than when a screen for selecting the game to play is displayed and arrange the command information in the area.

BRIEF DESCRIPTION OF DRAWINGS

FIG. 3B is a rear view of the controller shown in FIG. 3A.

FIG. 4 is a schematic diagram showing a typical home screen.

FIG. 9 is a tabular view listing typical program management data.

FIG. 10 is a tabular view listing typical command management data.

FIG. 20 is a tabular view schematically listing typical arrangement determination rule data.

FIG. 22 is a flowchart showing another typical sequence of steps performed by the information processing device in the embodiment.

DESCRIPTION OF EMBODIMENT

One preferred embodiment of the present invention is described below in detail with reference to the accompanying drawings.

Figure 1:
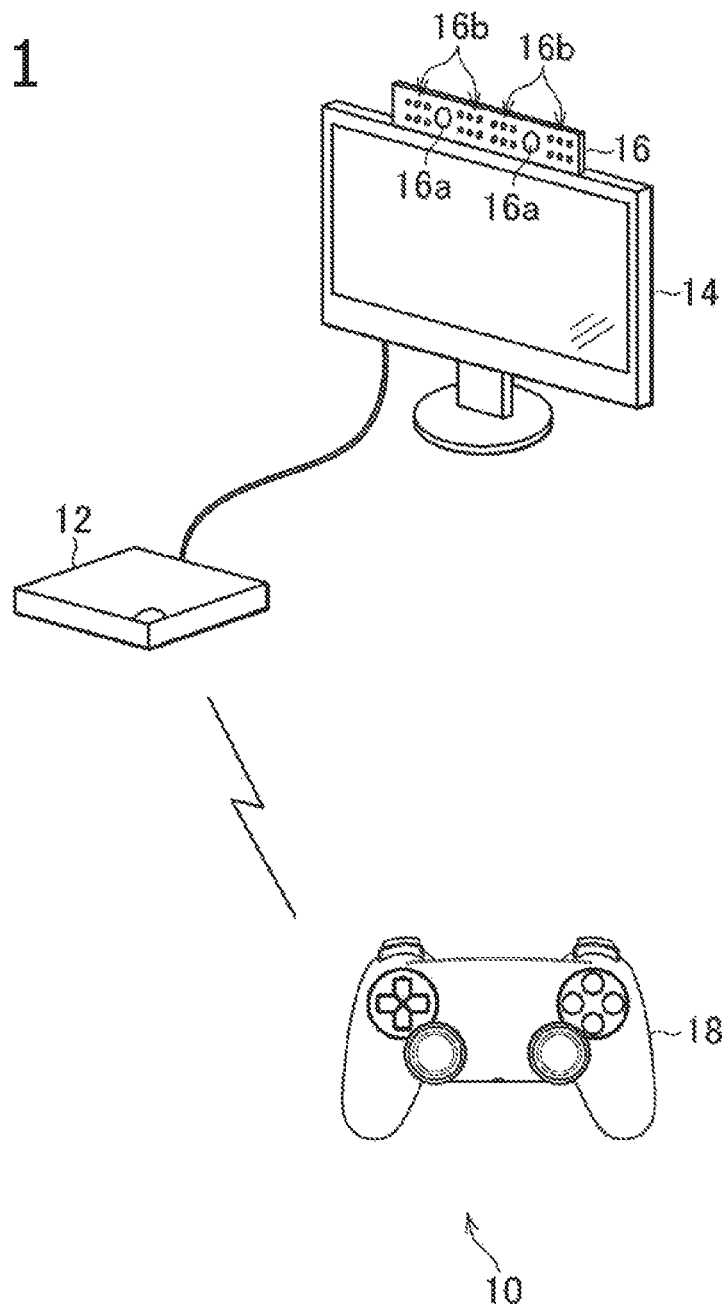
FIG. 1 is a schematic diagram showing a typical overall configuration of an information processing system in one embodiment of the present invention.

FIG. 1 is a schematic diagram showing a typical overall configuration of an information processing system 10 in one embodiment of the present invention. As shown in FIG. 1, the information processing system 10 in this embodiment includes an information processing device 12, a display unit 14, a camera/microphone unit 16, and a controller 18.

Figure 2:
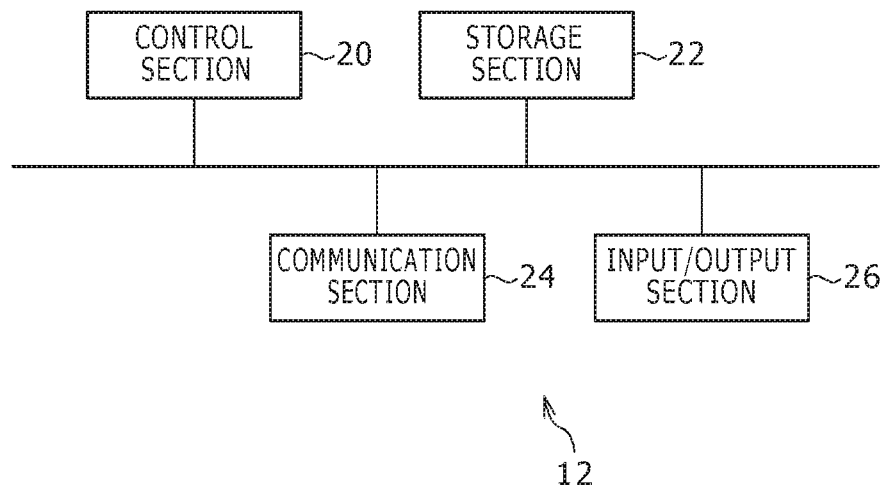
FIG. 2 is a schematic view showing a typical hardware structure of an information processing device in one embodiment of the present invention.

The information processing device 12 in this embodiment may be a computer such as an entertainment device typified by a game console. The information processing device 12 includes a control section 20, a storage section 22, a communication section 24, and an input/output section 26, as shown in FIG. 2 for example. The control section 20 is a program-controlled device such as a CPU operated by programs installed in the information processing device 12.

The storage section 22 is a storage device such as a ROM or RAM or is a hard disk drive. The storage section 22 stores resources such as the programs to be executed by the control section 20. The communication section 24 is a communication interface such as a network board or a wireless LAN module. The input/output section 26 is an input/output port such as an HDMI (registered trademark) (High-Definition Multimedia Interface) port or a USB port.

The display unit 14 in this embodiment is a liquid crystal display, for example. The display unit 14 displays, among others, screens generated by the information processing device 12. The display unit 14 in this embodiment also has speakers that output the sound represented by audio data generated by the information processing device 12. The camera/microphone unit 16 in this embodiment includes cameras 16a and microphones 16b. The cameras 16a capture an image of a target object for example, and output the captured image to the information processing device 12. The microphones 16b acquire an ambient sound, convert the sound into audio data, and output the audio data to the information processing device 12.

The information processing device 12 and the display unit 14 are interconnected by an AV cable or by an HDMI cable, for example. The information processing device 12 and the camera/microphone unit 16 are interconnected by a USB cable, an AV cable, or an HDMI (registered trademark) (High-Definition Multimedia Interface) cable, for example.

Figure 3A:
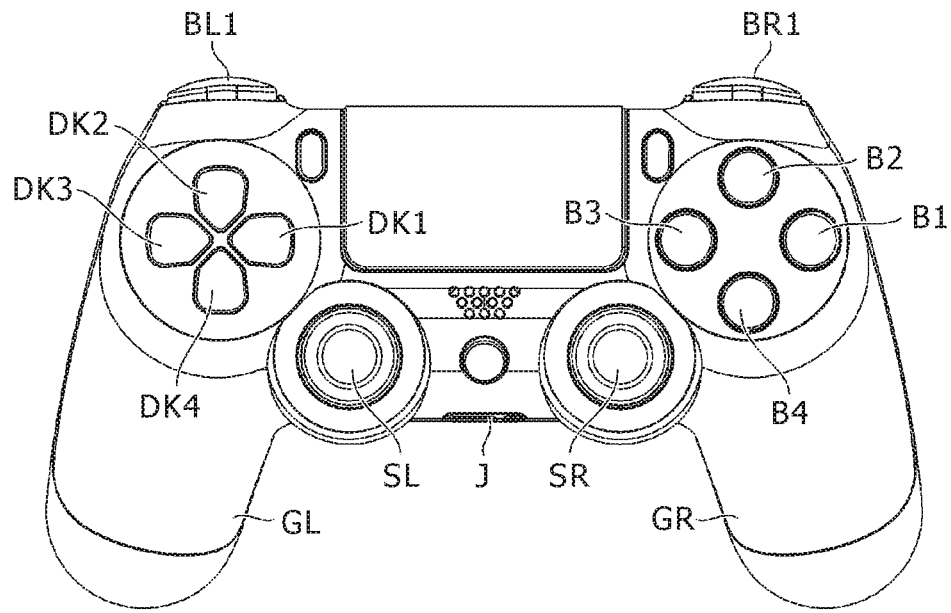
FIG. 3A is a plan view of a typical controller in one embodiment of the present invention.

The controller 18 in this embodiment is an operation input device for performing input operations on the information processing device 12. FIG. 3A is a plan view of the controller 18 in this embodiment. FIG. 3B is a rear view of the controller 18.

As shown in the figures, the controller 18 has grips GL and GR protruding from the right and left ends of a horizontally elongated body toward the user (underside of the sheet of FIG. 3B). When using the controller 18, the user holds the grips GL and GR with his or her right and left hands respectively.

Four arrow keys DK1 through DK4 and an operating stick SL are arranged on the top left face of the controller 18 in a manner operable by the thumb of the user's left hand holding the grip GL. Four buttons B1 through B4 and an operating stick SR are arranged on the top right face of the controller 18 in a manner operable by the thumb of the user's right hand holding the grip GR. Buttons BL1 and BL2 are arranged on the rear left side of the controller 18 in a manner operable by the index and middle fingers of the user's left hand holding the grip GL. Rear buttons BR1 and BR2 are arranged on the rear right side of the controller 18 in a manner operable by the index and middle fingers of the user's right hand holding the grip GR. The controller 18 in this embodiment also has other controls such as buttons and a touch sensor. The controller 18 in this embodiment further has sensors including a gyro sensor for detecting angular velocity and an acceleration sensor for detecting acceleration.

The controller 18 in this embodiment has a jack J. Plugging a microphone into the jack J allows the microphone to receive an input voice. The controller 18 converts the voice input through the plugged-in microphone into audio data for output to the information processing device 12.

This embodiment allows the user to input a voice into the microphones 16b included in the camera/microphone unit 16. The information processing device 12 recognizes the input voice and performs various processes corresponding to the result of voice recognition. The embodiment thus enables the user to operate the information processing device 12 by voice. While the microphone is being plugged in the jack J of the controller 18, this embodiment gives preference to the result of voice recognition by the plugged-in microphone over the result of voice recognition by the microphones 16b included in the camera/microphone unit 16.

The user can perform various input operations using the controller 18, such as pressing of the arrow keys DK1 through DK4, buttons B1 through B4, BL1, BL2, BR1 and BR2, or tilting of the operating sticks SL and SR. The controller 18 in this embodiment outputs the input data corresponding to such input operations to the information processing device 12.

The controller 18 in this embodiment has a USB port. The controller 18 is connect to the information processing device 12 by a USB cable. Therefore, the connection allows the input data to be output in wired fashion to the information processing device 12 via the input/output section 26. The controller 18 in this embodiment also has a wireless communication module for example. The module allows the input data to be output in wireless fashion to the information processing device 12 via the communication section 24.

FIG. 4 is a schematic diagram showing an example of a home screen 30 displayed on the display unit 14 in this embodiment. The home screen 30 in this embodiment allows the user to select one of the programs installed in the information processing device 12. This embodiment is assumed to have eight game programs, for example, installed in the information processing device 12.

In the initial state, the home screen 30 shows program icon images 32 as shown in FIG. 4 (program icon images 32-1 through 32-5 in the example of FIG. 4), each icon image corresponding to a program. The home screen 30 in FIG. 4 shows the program icon images 32 of five programs out of the eight programs installed in the information processing device 12. The home screen 30 also indicates that one of the program icon images 32 (program icon image 32-1 in the example of FIG. 4) is in the selected state. With this embodiment, the currently selected program icon image 32-1 is displayed in a manner different from the other program icon images 32. In the ensuing description, the currently selected option will be referred to as the option of interest. In the above example, the program icon image 32-1 is the option of interest.

As shown in FIG. 4, this embodiment shows a character string representing the name of the program corresponding to the program icon image 32-1 in the bottom right corner of the program icon image 32-1 constituting the option of interest. As the option of interest, the program icon image 32-1 is highlighted in contrast with the other program icon images 32 (32-2 through 32-5). As a specific example, the program icon image 32-1 is larger in size than the other program icon images 32 (32-2 through 32-5). The program icon image 32-1 is further shown enclosed in a frame. With this embodiment, these characteristics indicate that the program icon image 32-1 is currently selected, i.e., that the program icon image 32-1 is the option of interest. Apart from the technique presented in FIG. 4, other techniques may also be adopted to display a given program icon image 32 as the option of interest.

Suppose now that a predetermined period of time (e.g., 10 seconds) has elapsed after the home screen 30 in FIG. 4 is displayed. The home screen 30 displayed on the display unit 14 then transitions to a state shown in FIG. 5. The home screen 30 alternates between the state in FIG. 5 and another state shown in FIG. 6 at intervals of a predetermined time period (e.g., three seconds). In the state in FIG. 5, the home screen 30 shows a controller operation guide image 34 for guiding the operation content by use of the controller 18. In the state in FIG. 6, on the other hand, the home screen 30 shows a magic word guide image 36 giving prescribed information representative of a voice for starting voice recognition. FIG. 6 shows a phrase "START VOICE RECOGNITION" as an example of the prescribed information. In the ensuing description, the prescribed phrase representative of a voice for starting voice recognition will be referred to as the magic word.

As described above, upon elapse of the predetermined time period after the display of the home screen 30, this embodiment guides the user both through how to operate the controller 18 and through what kind of voice the user is to input. If the user is not ready to input a voice, the home screen 30 does not transition to the state in which the magic word guide image 36 is displayed on the screen in this embodiment. For example, if the camera/microphone unit 16 is not connected to the information processing device 12, with the microphone yet to be plugged into the jack J of the controller 18, the home screen 30 does not transition to the state in which the magic word guide image 36 is arranged on the screen.

Figure 5:
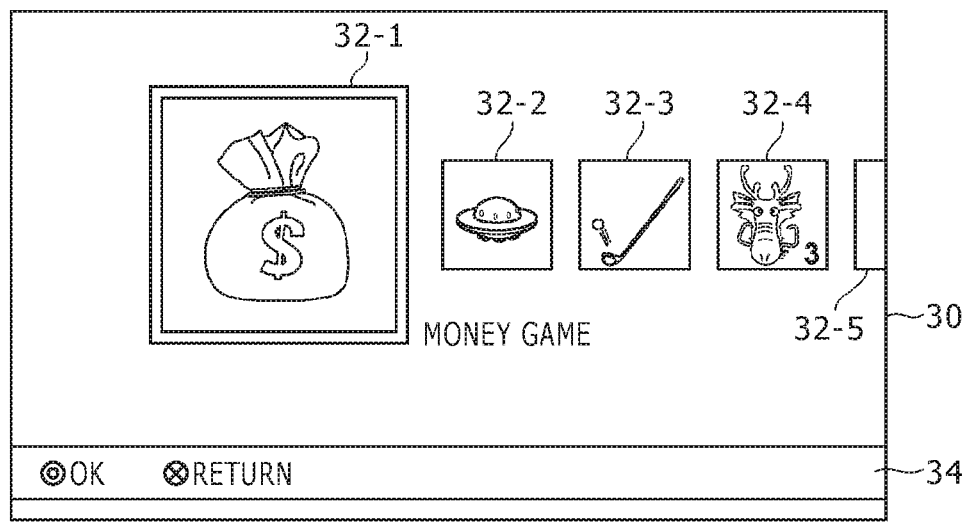
FIG. 5 is a schematic diagram showing another typical home screen.
Figure 6:
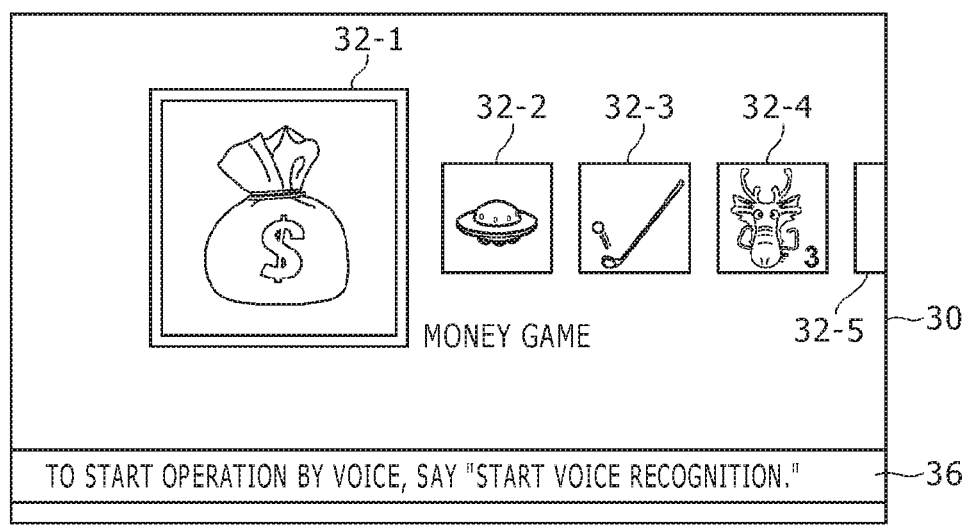
FIG. 6 is a schematic diagram showing another typical home screen.
Figure 7:
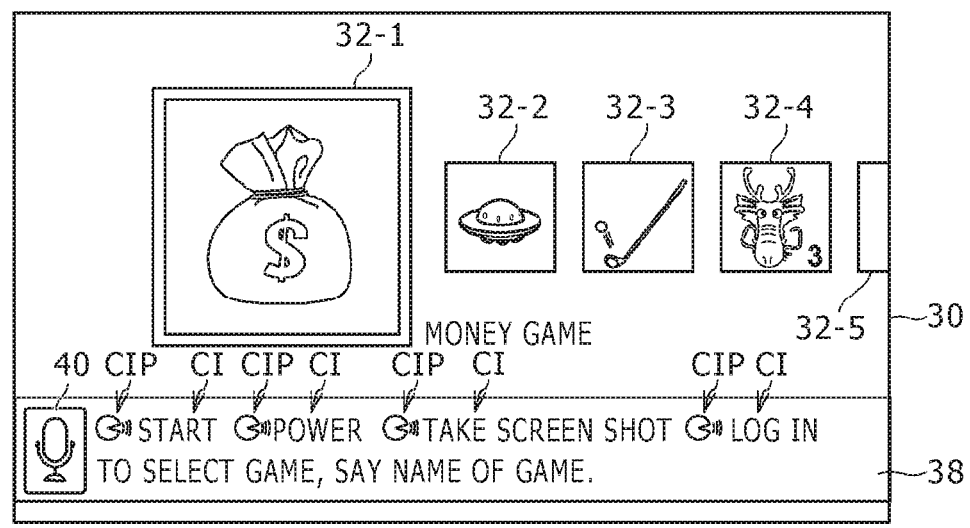
FIG. 7 is a schematic diagram showing another typical home screen.

When the home screen 30 is in the state in FIG. 4, 5 or 6 and when the information processing device 12 receives the voice representing the magic word, the home screen 30 transitions to a state shown in FIG. 7. Also, with the home screen 30 in the state in FIG. 4, 5 or 6, operations performed on specific controls such as pressing of the button BR2 cause the home screen 30 to transition to the state in FIG. 7 in this embodiment. In the state in FIG. 7, a voice input guide image 38 for guiding the user through what kind of voice the user is to input is arranged on the home screen 30.

With the voice input guide image 38 arranged on the home screen 30, this embodiment allows the user to input a voice. The input voice causes the information processing device 12 to recognize the information given by the voice and determine a command represented by the voice on the basis of the result of recognition. The information processing device 12 proceeds to execute the process corresponding to the command. In the ensuing description, the state in which the voice input guide image 38 is displayed on the screen to enable command input by voice will be referred to as the voice command input enabled state. The state in which the voice input guide image 38 is not displayed on the screen thus disabling command input by voice will be referred to as the voice command input disabled state. This embodiment allows the information processing device 12 to be placed in the voice command input enabled state either by operation of the controller 18 or by voice input of the magic word as described above. While the information processing device 12 remains in the voice command input enabled state, the volume of the sound output from the speakers may be controlled to be low.

Upon elapse of a predetermined time period (e.g., 10 seconds) during which neither operation of the controller 18 nor voice input takes place after the voice command input enabled state is entered, this embodiment places the information processing device 12 in the voice command input disabled state. Following transition to the voice command input enabled state, operating the controller 18 also places the information processing device 12 in the voice command input disabled state. If the information processing device 12 is placed in the voice command input disabled state while the display unit 14 is displaying the home screen 30 shown in FIG. 7, the home screen 30 returns to the screen shown in FIG. 4.

In the voice command input enabled state, the command corresponding to the received voice is identified provided the volume of the received voice falls within a predetermined range of volume. It is assumed hereunder that the command corresponding to the received voice is identified provided the volume of the received voice is equal to or higher than a lower volume limit L and equal to or lower than a higher volume limit H. Alternatively, the average of the volumes of the voices received over a predetermined time period up to the present may be handled as the volume of the currently received voice. A volume image 40 representing the volume of the voice currently received by the information processing device 12 is arranged in the voice input guide image 38 in FIG. 7. The volume image 40 is displayed on the display unit 14 in a manner reflecting the volume of the currently received voice for example. Specifically, while no voice is being received, the volume image 40 is shown enclosed in a blue frame against a black background for example. Upon receipt of a voice, the background is turned blue. In this case, the higher the volume of the received voice, the deeper the blue the background of the volume image 40 may be turned.

If the volume of the received voice is higher than the higher volume limit H, this embodiment does not identify any command corresponding to the received voice. The volume image 40 is then shown in a manner indicating that no command is being identified. Specifically, if the volume of the received voice is higher than the higher volume limit H, the volume image 40 is shown enclosed in a red frame against a red background for example. The information processing device 12 in this embodiment thus causes the volume image 40 to be displayed on the display unit 14 in a manner reflecting the volume of the received voice. This display prompts the user to input the command by voice with an appropriate volume. In the ensuing description, it is assumed that the user performs voice input within a predetermined volume range, e.g., equal to or higher than the lower volume limit L and equal to or lower than the higher volume limit H.

This embodiment shows the voice input guide image 38 in FIG. 7 to have at least one piece of command information CI indicative of a command arranged therein. This embodiment has phrases each arranged as the command information CI representing a command. Alternatively, the phrases as the command information CI may be replaced with other information such as icon images symbolizing the commands.

The command information CI is associated with the commands that can be received by the information processing device 12. When the user inputs a voice represented by command information CI, this embodiment executes the process corresponding to the command associated with the command information CI.

Four pieces of command information CI are arranged on the home screen 30 in FIG. 7. This embodiment has a command identification picture CIP arranged on the left of each piece of command information CI on the home screen 30. Each command identification picture CIP allows the user to recognize that inputting the voice represented by the command information CI to the right of the picture CIP executes the process corresponding to the command associated with the command information CI.

This embodiment also assigns the controls such as the buttons of the controller 18 to the commands represented by the command information CI. Pressing a given button executes the process corresponding to the command assigned to that button. This embodiment thus allows the process corresponding to each command represented by the command information CI to be executed either by operation of the controls or by voice input.

Figure 8:
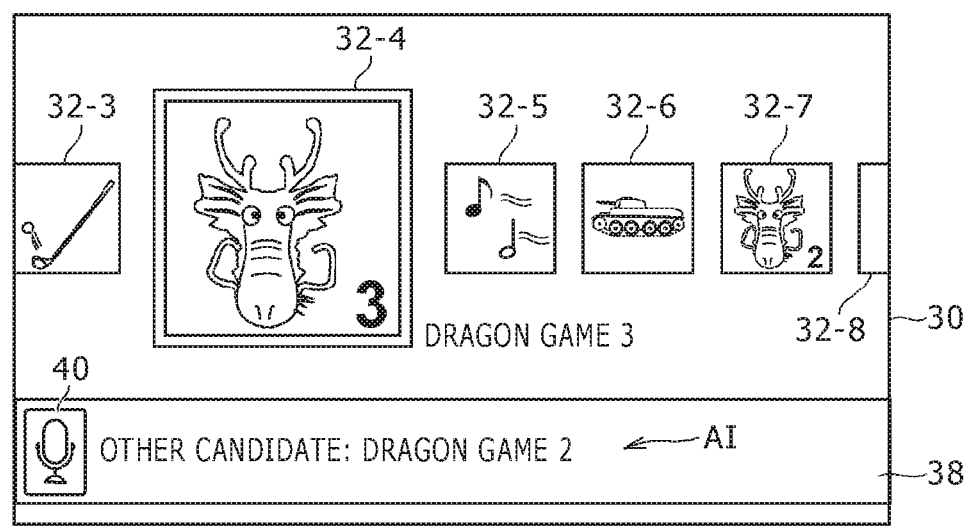
FIG. 8 is a schematic diagram showing another typical home screen.

With this embodiment, each displayed program icon image 32 is assigned at least one piece of information such as the name, abbreviated name, or nickname of the program associated with the program icon image 32. When the user inputs a voice representing the name of a program for example, this embodiment identifies the program icon image 32 associated with the program as the option of interest. If the input voice represents the names of a plurality of programs, the program icon image 32 associated with one of the programs is identified as the option of interest. If the information processing device 12 receives a voice phonetically representing a phrase "Dragon Game" while the home screen 30 in FIG. 7 is being displayed, this embodiment switches the home screen 30 to a state shown in FIG. 8. Six program icon images 32 (32-3 through 32-8) are arranged on the home screen 30 shown in FIG. 8. If the program icon image 32-4 is identified as the option of interest, the program icon image 32-4 is highlighted on the home screen 30, as shown in FIG. 8.

If the input voice represents the names or other designations of a plurality of programs, this embodiment identifies as the alternative option one of the program icon images 32 corresponding to these programs with the exception of the program icon image 32 constituting the option of interest. The embodiment then arranges on the voice input guide image 38 the name of the program associated with the alternative option. In the example in FIG. 8, the voice input guide image 38 is shown indicating alternative option information AI indicating the name of the program associated with the program icon image 32-7. In the example in FIG. 8, a name "Dragon Game 2" is included in the alternative option information AI.

This embodiment identifies the option of interest and the alternative option on the basis of program management data shown in FIG. 9 and command management data shown in FIG. 10.

As shown in FIG. 9, the program management data includes program IDs, program name data, vendor name data, voice command data, and last play date and time data, for example. The program ID is identification information that identifies each program. The program name data indicates the name of the program. The vendor name data denotes the name of the vendor that offers the program. The voice command data is information indicative of the command for identifying the program icon image 32 corresponding to the program as the option of interest or as the alternative option. This embodiment allows at least one voice command data value to be set for each program to indicate the name, abbreviated name, nickname, or some other designation of each program. FIG. 9 lists typical program management data in which three values of voice command data are set: a first voice command data value, a second voice command data value, and a third voice command data value. This embodiment sets character strings as the voice command data values, each character string representing a voice to be received. The last play date and time data indicates the date and time at which the program was last played.

This embodiment sets a character string representative of the name of a given program as one of the voice command data values associated with that program. In the example in FIG. 9, the program named "Dragon Game 3" and the program named "Dragon Game 2" are shown set with character strings representing their respective names as the third voice command data value.

On the basis of the program management data given in FIG. 9, this embodiment generates the command management data listed in FIG. 10. The command management data is used to manage the relations between each received voice and the process to be executed in response to receipt of the voice. As shown in FIG. 10, the command management data includes voice command data representative of each received voice and process content data indicative of the process to be executed in response to receipt of the voice. FIG. 10 lists character strings each representing a received voice as a voice command data value.

This embodiment sets, in the program management data, the first, the second, and the third voice command data values as the voice command data values in the command management data. In this manner, the embodiment sets three voice command data values associated with each program in the command management data. In the command management data, the data representing two processes prioritized for each program is set as process content data values associated with the three voice command data values corresponding to the program. In the example in FIG. 10, a first priority process is set that identifies as the option of interest the program icon image 32 associated with a given program, and a second priority process is set that identifies the program icon image 32 as the alternative option.

In the command management data, this embodiment also sets as a voice command data value a character string representing the voice indicated by the command information CI arranged on the screen. As a value of the process content data associated with given voice command data in the command management data, a data value is set that represents the process to be executed upon receipt of the voice described by the voice command data.

This embodiment then executes the process represented by the process content data associated, in the command management data, with the voice command data indicative of the received voice.

For example, suppose that with the home screen 30 in FIG. 8 displayed on the display unit 14, the information processing device 12 receives a voice phonetically representing the phrase "START." The receipt of the voice initiates execution of the program associated with the program icon image 32-4 as the option of interest. When the information processing device 12 receives a voice phonetically representing the phrase "POWER," a power control screen 44 (see FIG. 17) is displayed on the display unit 14. When the information processing device 12 receives a voice phonetically representing the phrase "TAKE SCREEN SHOT," a capture image capturing the display content on the home screen 30 as a still image is stored into the storage section 22 of the information processing device 12. When the information processing device 12 receives a voice phonetically representing the phrase "LOG IN," a screen showing a list of users is displayed on the display unit 14. The user then logs in through the screen by vocally inputting the user's identifier registered in the information processing device 12.

As shown in FIG. 10, this embodiment may associate each of a plurality of voice command data values representing the same character string with a mutually different process in the command management data. Such voice command data values set in duplicate may be referred to as duplicative voice command data. For example, a voice command data value "DRAGON GAME" and another voice command data value "DG" listed in FIG. 10 constitute duplicative voice command data.

Where a received voice turns out to be duplicative voice command data in which voice command data values are set in duplicate, the programs involved are prioritized according to predetermined rules.

In prioritizing the programs, this embodiment first identifies the process associated with each of the voice command data values set in duplicate. The embodiment then identifies the programs corresponding to the program icon image 32 identified as the option of interest or as the alternative option regarding the process involved. For example, if the received voice phonetically represents "DRAGON GAME," the embodiment identifies the program named Dragon Game 3 and the program named Dragon Game 2. Of the programs thus identified, the program executed at the latest timing is determined as the first priority program, and the program executed at the second latest timing is determined as the second priority program. For example, this embodiment causes the program of which the last play date and time data is the latest in the program management data to be determined as the first priority program, and the program whose last play date and time data is the second latest to be determined as the second priority program. This is how this embodiment prioritizes the programs. However, the method of determining program priorities is not limited to what was discussed above.

This embodiment then executes the process that corresponds to the first priority program and is set as the first priority process in the process content data, followed by the process corresponding to the second priority program and set as the second priority process in the process content data. A process is executed at this time, for example, to identify the program icon image 32 corresponding to the first priority program as the option of interest, and identify the program icon image 32 corresponding to the second priority program as the alternative option. This embodiment executes the processes corresponding to the programs executed at the last and the second last timings, but does not execute processes corresponding to the programs executed at the third last timing or at subsequent timings.

For example, if the received voice phonetically represents "DRAGON GAME" or "DG," the program icon image 32-4 is identified as the option of interest and the program icon image 32-7 as the alternative option according to the above-mentioned rules. On the basis of the option of interest and the alternative option thus identified, this embodiment generates the home screen 30 shown in FIG. 8 and displays it on the display unit 14.

Suppose that while the home screen 30 in FIG. 8 is being displayed, the voice phonetically representing "Dragon Game 2" arranged as the alternative option information AI on the home screen 30 is received. This triggers identification of the voice command data of which one value "DRAGON GAME TWO" is found in the command management data in FIG. 10. This in turn executes a process of identifying as the option of interest the program icon image 32-7 that corresponds to Dragon Game 2 and is associated with the identified voice command data as the first priority process in the command management data. The home screen 30 is then displayed on which the program icon image 32-7 identified as the option of interest is highlighted.

The user may wish to execute, for example, the program corresponding to the alternative option rather than the program corresponding to the option of interest. Specifically, the user may prefer playing the game named "Dragon Game 2" to playing the game named "Dragon Game 3." In preparation for such an eventuality, this embodiment displays information indicating that the option of interest is being selected, and the alternative option information AI as information representing the voice for allowing the alternative option to be identified as the option of interest in response to receipt of the voice. When the user inputs the voice described by the alternative option information AI, the alternative option is identified as the option of interest. This brings about a state in which the program icon image 32 newly identified as the option of interest is selected. In this manner, the embodiment guides the user through what kind of voice to input in order to identify the alternative option as the option of interest.

Alternatively, the embodiment may arrange, as the above-mentioned alternative option information AI, the information indicative of the voice corresponding to one of a plurality of voice command data values associated with the alternative option. In this case, the embodiment may arrange as the alternative option information AI the information representative of the voice corresponding to a value different from that of the voice command data associated with the option of interest. This prevents the current option of interest from getting selected again as the option of interest when the user inputs the voice described by the alternative option information AI.

As another alternative, the option corresponding to the recently executed program may be identified as the option of interest or as the alternative option. Specifically, as mentioned above, the option corresponding to the program executed at the latest timing from among a plurality of options corresponding to a plurality of programs may be identified as the option of interest, for example. Also, the option corresponding to the program executed at the second latest timing may be identified as the alternative option. In this manner, the more recently the program is executed, the more preferentially the program may be selected as the option of interest or as the alternative option. Generally, the user tends to again execute recently executed programs. According to the above method, the option corresponding to the user's preferred programs is more likely to be identified as the option of interest or as the alternative option.

As still another alternative, the option of interest and the alternative option may be identified on the basis of the attribute values associated with the programs except for their latest execution timings. In this case, for example, the option identified as having the highest priority may be identified as the option of interest and the option identified as having the second highest priority may be identified as the alternative option on the basis of the attributes associated with the programs. Where there are a plurality of options associated with the voice command data representing the received voice, one of the options is thus determined as the option of interest and another as the alternative option in accordance with the attribute values associated with the options.

As still another alternative, the option of interest and the alternative option may be identified on the basis of the attribute values that can be set by the user or by the vendor of the programs. In this case, where there exist a plurality of options associated with the voice command data representing the received voice, it is the user or the vendor of the programs that has control over how to identify one of the options as the option of interest and another as the alternative option.

It was explained above that one of the options associated with the information representing the received voice is identified as the alternative option. Alternatively, an option associated with the option of interest may be identified as the alternative option, for example. Specifically, an option determined as an option recommended to the user in connection with the option of interest identified may be identified as the alternative option, for example. If there are, for example, a plurality of options recommended to the user, one of the plurality of options may be identified as the alternative option on the basis of such attribute values as the date and time at which the program associated with the options was last executed, for example. As another example, an option corresponding to any of the programs of which the vendor also offers the program corresponding to the option of interest may be identified as the alternative option. This guides the user through what kind of voice to input when identifying as the option of interest an option associated with the option of interest.

As still another alternative, the value of the voice command data representing the voice associated with the options corresponding to the program may be information that is set by the vendor of the program associated with these options. This allows the vendor of a given program to set as a voice command data value the abbreviated name or some other designation of the program which is popular among its users, so that the program is more likely to be selected as the option of interest or as the alternative option.

While the home screen 30 in FIG. 8 is being displayed, the information processing device 12 may receive the voice phonetically representing the phrase "START." The receipt of the voice starts execution of the program corresponding to the program icon image 32-4 in the selected state. This embodiment starts executing the game program named "Dragon Game 3." At this time, the value of the last play date and time data corresponding to the program is updated to the present date and time.

Figure 11:
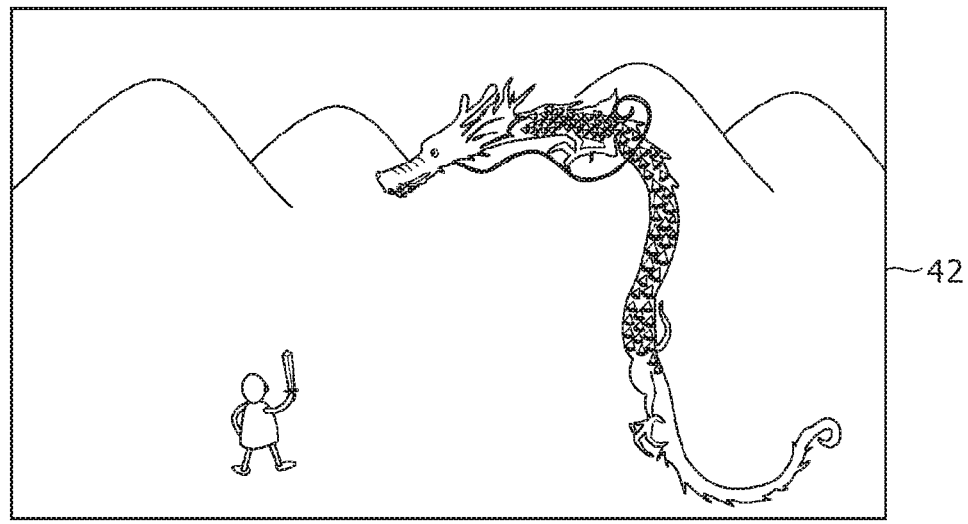
FIG. 11 is a schematic diagram showing a typical play screen.

FIG. 11 is a schematic diagram showing a typical play screen 42 that is generated upon execution of the game program and displayed on the display unit 14. As long as the play screen 42 in FIG. 11 is being displayed, the information processing device 12 is in the voice command input disabled state. Upon receiving the magic word at this point for example, the information processing device 12 transitions to the voice command input enabled state. The play screen 42 then switches to a state shown in FIG. 12 where the voice input guide image 38 is arranged. Command information CI indicating the command for returning to the home screen 30 is arranged in the voice input guide image 38 in FIG. 12. A command identification picture CIP is arranged on the left of the command information CI.

Figure 12:
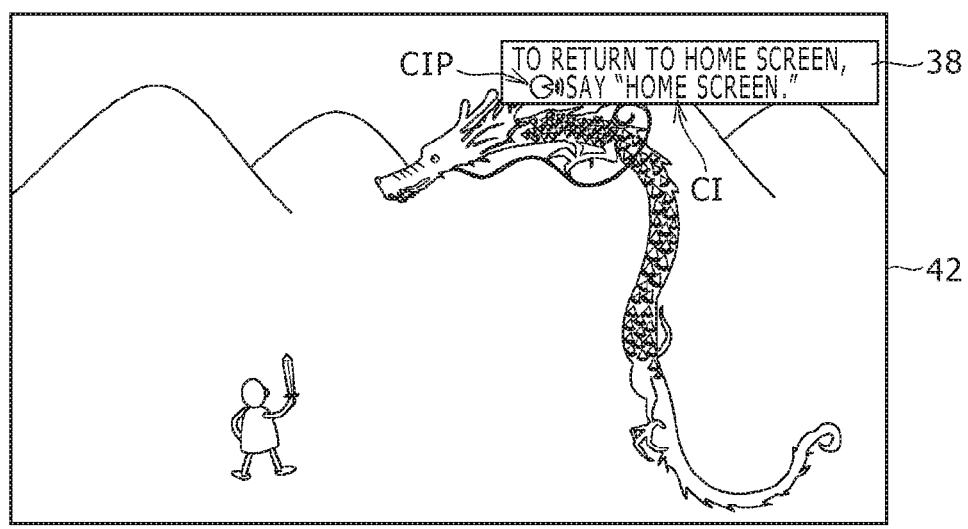
FIG. 12 is a schematic diagram showing another typical play screen.
Figures 13, 14:
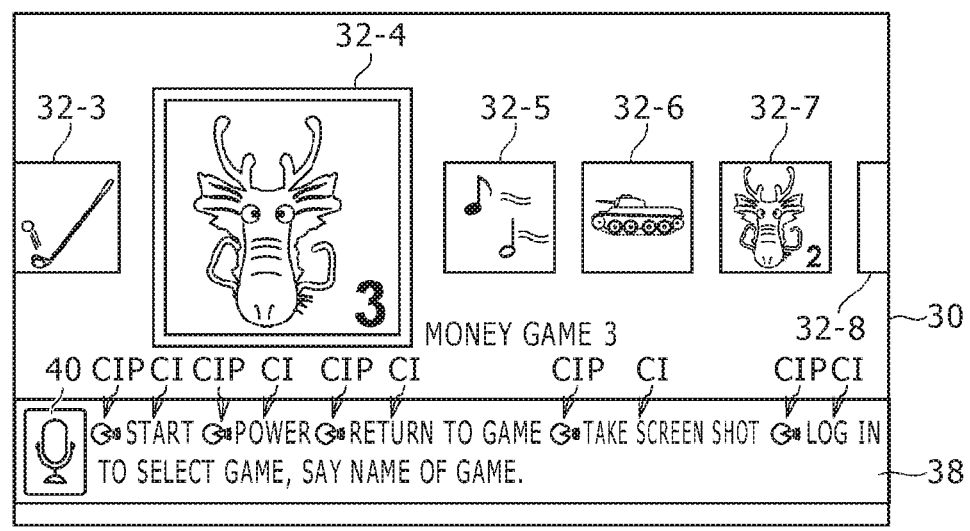
FIG. 13 is a tabular view listing other typical command management data.
FIG. 14 is a schematic diagram showing another typical home screen.

FIG. 13 is a tabular view listing other typical command management data in effect when the play screen 42 in FIG. 12 is displayed. With the play screen 42 in FIG. 12 displayed, the process to be executed on the basis of the command management data listed in FIG. 13 is determined.

While the play screen 42 in FIG. 12 is being displayed, the information processing device 12 may receive the voice phonetically representing the phrase "HOME SCREEN." The receipt of the voice causes the screen displayed to switch to the home screen 30 shown in FIG. 14. The voice input guide image 38 arranged on the home screen 30 in FIG. 14 is basically the same as that in FIG. 7. The difference is that the voice input guide image 38 in FIG. 14 is supplemented with command information CI indicating the command for returning to the play screen 42, the command being represented by the phrase "RETURN TO GAME." If the information processing device 12 receives at this point the voice phonetically representing the phrase "RETURN TO GAME," the home screen 30 displayed on the display unit 14 transitions to the play screen 42. The processes corresponding to the other commands executable when the home screen 30 in FIG. 14 is displayed may also be executed by voice input in the same manner as when the home screen 30 in FIG. 7 is displayed.

Figure 15:
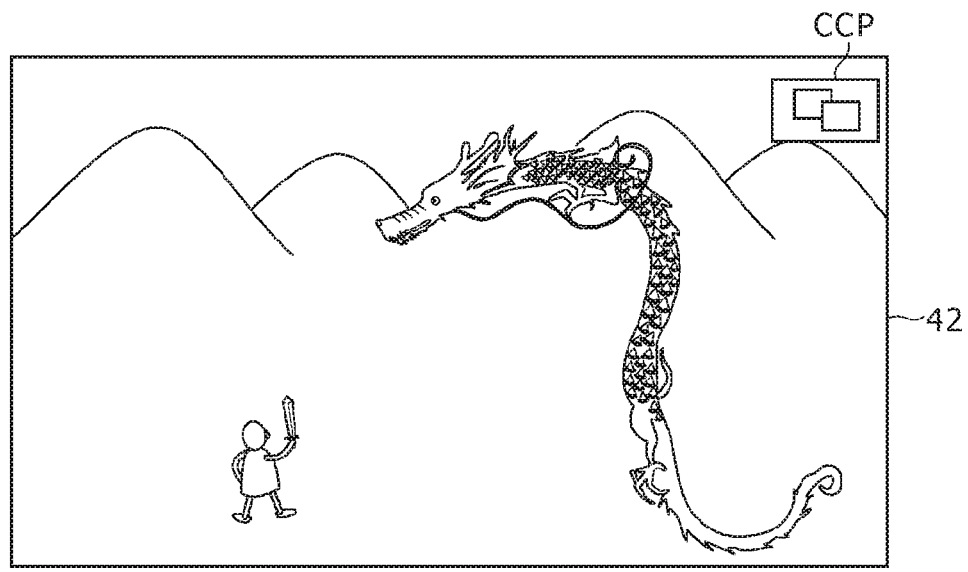
FIG. 15 is a schematic diagram showing another typical play screen.

While the play screen 42 in FIG. 12 is being displayed, the information processing device 12 may receive the voice phonetically representing the phrase "TAKE SCREEN SHOT." The receipt of the voice causes the storage section 22 of the information processing device 12 to store a capture image capturing the display content on the play screen 42. With the capture image stored in the storage section 22, there appears for a predetermined time period a play screen 42 on which a capture complete picture CCP indicative of image storage is arranged in the top right corner, as shown in FIG. 15. The information processing device 12 transitions to the voice command input disabled state. When the information processing device 12 receives the voice phonetically representing the phrase "LOG IN," the display unit 14 displays a screen showing a list of users. These processes are set in the command management data listed in FIG. 13. Thus according to this embodiment, some of the processes corresponding to the commands whose corresponding command information CI is not displayed can be executed by voice input.

For example, suppose that, on the play screen 42, the command information CI is arranged at the same positions as those on the home screen 30 in FIG. 7 or FIG. 14. Where objects for the player and other resources are arranged at the bottom of the play screen 42 as shown in FIG. 11 for example, such arrangement can be a nuisance for the user playing the game. As explained above, this embodiment causes the information processing device 12 to arrange the command information CI at a suitable position on the screen depending on its display content. Specifically, the voice input guide image 38 is arranged at the bottom of the home screen 30 but is in the top right corner on the play screen 42 for example. In this manner, this embodiment reduces the risk of letting the command information CI arranged on the screen become a nuisance for the user playing the game.

The information processing device 12 in this embodiment causes the voice input guide image 38 to hide a screen area of the display content that varies depending on the display content of the screen. Specifically, while the game play screen 42 is being displayed, the command information CI is arranged over a smaller screen area than when the home screen 30 for selecting the game to play is displayed so as to hide the display content for example. In this manner, the embodiment makes the command information CI easier for the user to view while reducing the risk of letting the command information CI arranged on the screen become a nuisance for the user.

The information processing device 12 in this embodiment has control over whether or not to arrange the command information CI corresponding to a specific command depending on the display content of the screen. Specifically, the command information CI indicating the command for storing a capture image capturing the display content of the screen is arranged on the home screen 30 in FIG. 7 or in FIG. 14 but not on the play screen 42 in FIG. 12 for example. However, with the play screen 42 in FIG. 12 displayed, the information processing device 12 may receive the voice phonetically representing the phrase "TAKE SCREEN SHOT." In that case, the information processing device 12 performs the process of storing the capture image capturing the display content on the play screen 42. As described above, where the area in which the command information CI is arranged should preferably be as small as possible for example, it is possible not to display the command information CI regarding some of the commands that can be received through voice input. When the area in which the command information CI appears is thus minimized in size, the risk of letting the command information CI displayed on the screen become a nuisance for the user can be further reduced.

Figure 16:
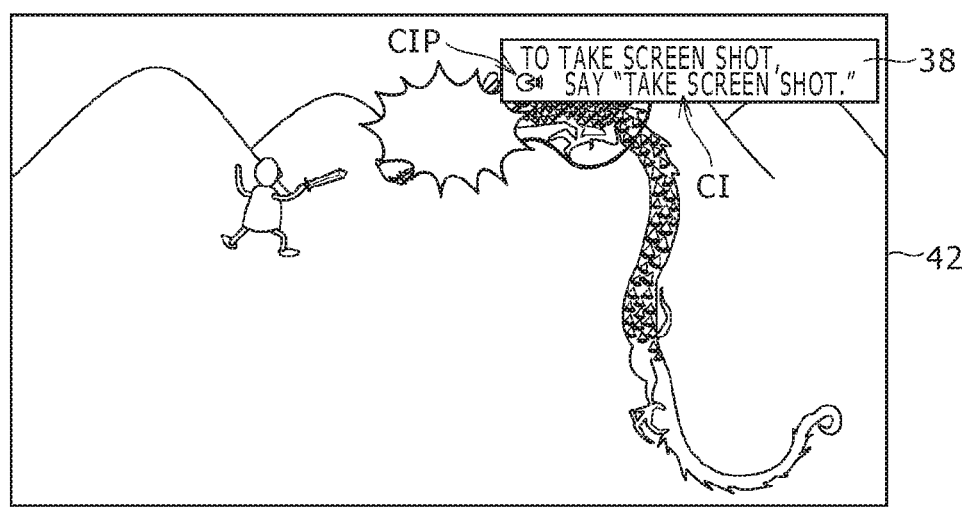
FIG. 16 is a schematic diagram showing another typical play screen.

As another alternative, the information processing device 12 may have control over whether or not to arrange each of a plurality of pieces of command information CI depending on the display content of the screen. For example, as shown in FIG. 16, the command information CI indicating the command for storing a capture image capturing the display content of the screen may be arranged on the screen instead of the command information CI indicating the command for returning to the home screen 30 depending on the display content of the screen. The example in FIG. 16 shows a scene in which a dragon is dispatched during a game. The user is highly likely to save a capture image of that scene. Such scenes may thus be accompanied by the command information CI arranged to indicate the command for storing a capture image capturing the display content of the screen.

If the information processing device 12 receives the voice phonetically representing the phrase "TAKE SCREEN SHOT" while the play screen 42 in FIG. 16 is being displayed, a capture image capturing the display content of the play screen 42 may be stored into the storage section 22. When the information processing device 12 receives the voice phonetically representing the phrase "HOME SCREEN," the currently displayed screen may be replaced with the home screen 30 in FIG. 14.

Figure 17:
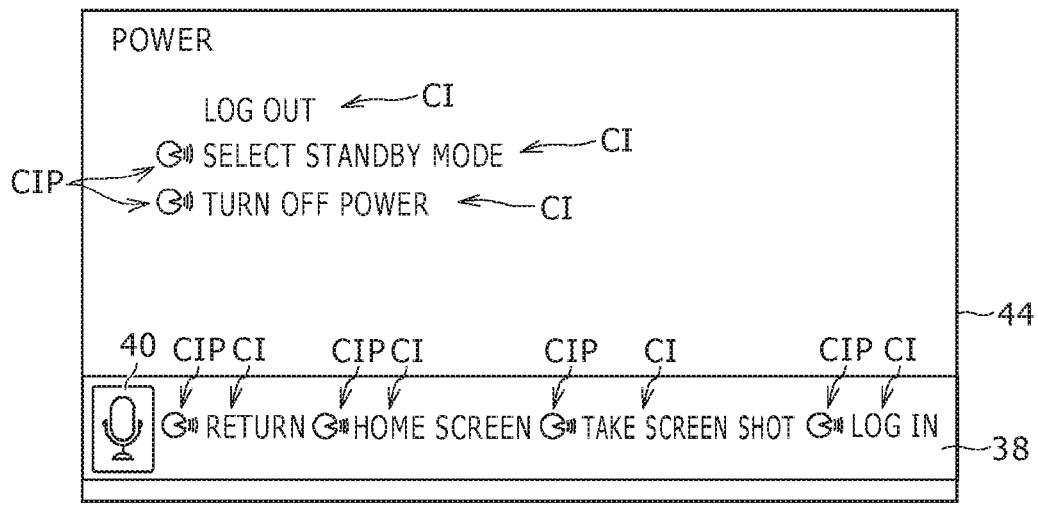
FIG. 17 is a schematic diagram showing a typical power control screen.

As described above, this embodiment causes the display unit 14 to display the power control screen 44 shown in FIG. 17 if the information processing device 12 receives the voice phonetically representing the phrase "POWER" while the home screen 30 in FIG. 7, 8 or 14 is being displayed. With the power control screen 44 in FIG. 17 displayed, the information processing device 12 still remains in the voice command input enabled state.

The power control screen 44 shown in FIG. 17 has four pieces of command information CI arranged in the voice input guide image 38. A command identification picture CIP is arranged on the left of each of these pieces of command information CI. In addition to the command information CI in the voice input guide image 38, the power control screen 44 includes command information CI corresponding to a command for logging out, a command for selecting standby mode, and a command for turning off power. A command identification picture CIP is arranged on the left of the command information CI corresponding to the command for selecting standby mode as well as on the left of the command information CI corresponding to the command for turning off power.

Upon receipt of the voice phonetically representing the phrase "SELECT STANDBY MODE," the information processing device 12 selects standby mode. At the time of receiving the voice phonetically representing the phrase "TURN OFF POWER," the information processing device 12 turns off its power. This embodiment thus allows the information processing device 12 to be switched off by voice input.

This embodiment does not allow the process of logging out to be executed by voice input. The unavailability of voice input will be recognized by the user who will notice that no command identification picture CIP is arranged on the left of the command information CI indicating the command for logging out.

Figure 18:
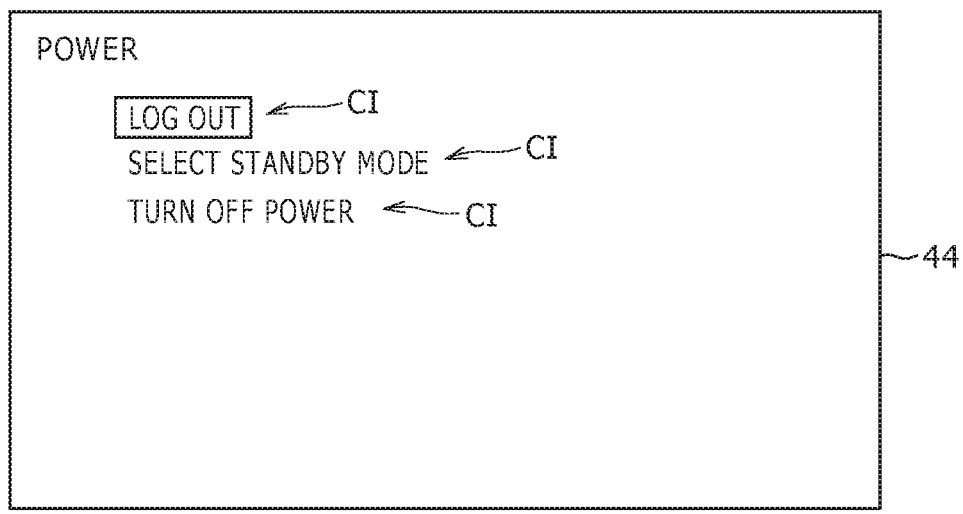
FIG. 18 is a schematic diagram showing another typical power control screen.

If the controller 18 is operated while the power control screen 44 in FIG. 17 is being displayed, the information processing device 12 enters the voice command input disabled state. The currently displayed power control screen 44 transitions to a state shown in FIG. 18. The power control screen 44 in FIG. 18 has no voice input guide image 38 arranged thereon. Also deleted are the command information CI corresponding to the command for selecting standby mode and the command identification picture CIP arranged on the left of the command information CI corresponding to the command for turning off power. The command information CI indicating the command for logging out and arranged at the top of the screen is enclosed in a frame indicating the selected state currently in effect. In this state, the user may operate the controller 18 to select one of the commands corresponding to the three pieces of command information CI shown in FIG. 18, the designated command designating the process to be executed. Performing a prescribed operation, such as pressing of the button B1, executes the process corresponding to the command corresponding to the command information CI in the selected state.

In the above-described example, the capture image capturing the display content through voice input is stored as a still image into the storage section 22. Alternatively, a video captured by the information processing device 12 of the display content through voice input may be stored instead. Specifically, upon receiving the voice phonetically representing the phrase "START RECORDING," the information processing device 12 may start capturing the screen. Upon receipt of the voice phonetically representing the phrase "STOP RECORDING," the information processing device 12 may stop capturing the screen. The information processing device 12 may then store into its storage section 22 a video constituted by a series of images captured from the start to the end of capturing as a capturing movie.

This embodiment allows the information processing device 12 to set one of a plurality of predetermined languages as the system language. However, some of these languages are not supported by the embodiment for voice recognition. If an attempt is made to select one of the unsupported languages as the system language, this embodiment causes the display unit 14 to display a message that the selected language is not supported for voice recognition. In this case, an alternative language such as English is set for voice recognition, replacing the unsupported language. Pieces of command information CI representing the commands receivable through voice input are then displayed in the language set for voice recognition.

Below is a further description of control over where to arrange the command information CI and of the process of identifying the option of interest and the alternative option.

Figure 19:
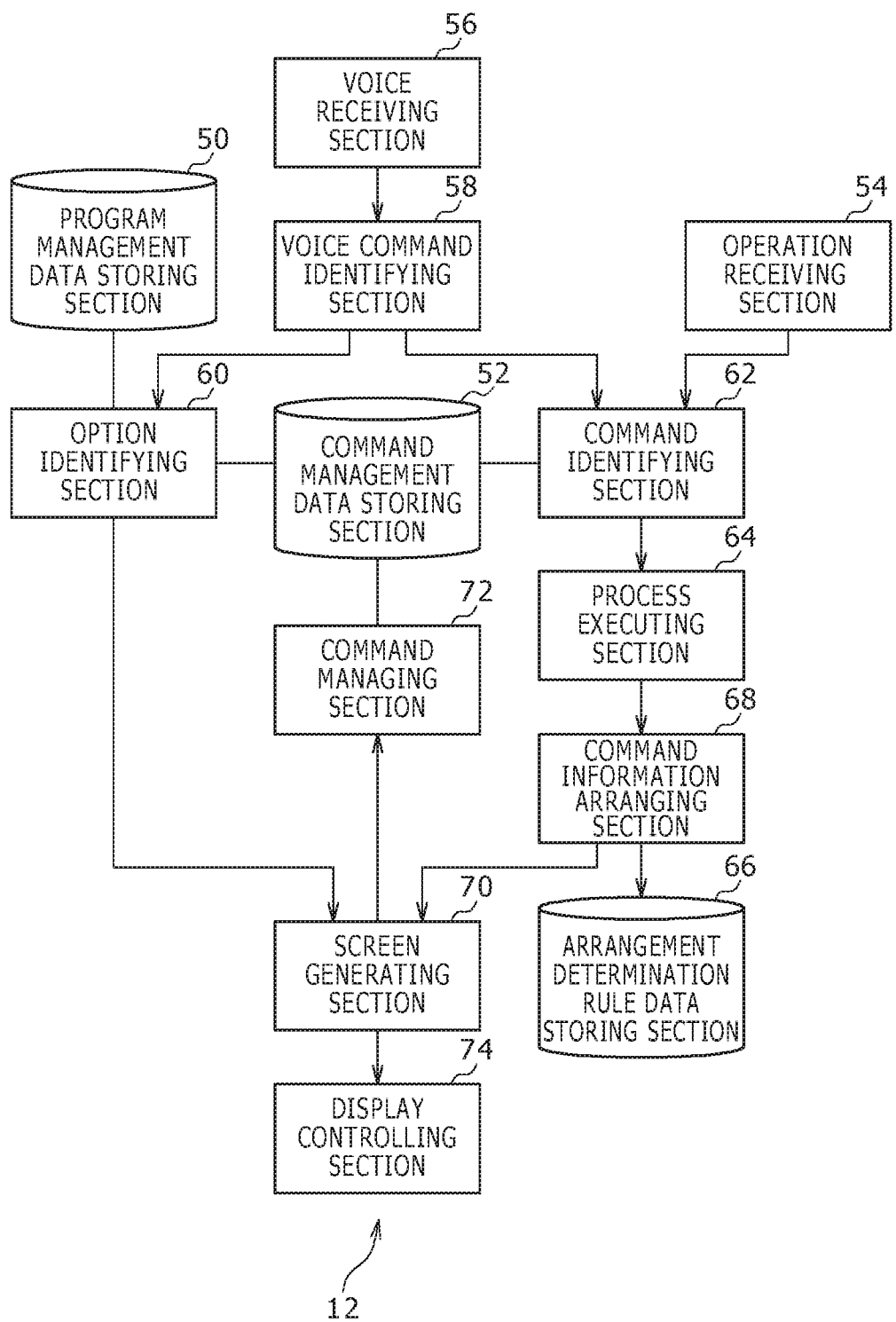
FIG. 19 is a functional block diagram showing typical functions implemented by the information processing device in one embodiment of the present invention.

FIG. 19 is a functional block diagram showing typical functions implemented by the information processing device 12 in this embodiment, the functions concerning control over where to arrange the command information CI and the process of identifying the option of interest and the alternative option. Not all of the functions in FIG. 19, it should be noted, need to be implemented by the information processing device 12 in this embodiment. Also, functions other than those shown in FIG. 19 may be added to the embodiment.

As shown in FIG. 19, the information processing device 12 in this embodiment functionally includes, for example, a program management data storing section 50, a command management data storing section 52, an operation receiving section 54, a voice receiving section 56, a voice command identifying section 58, an option identifying section 60, a command identifying section 62, a process executing section 64, an arrangement determination rule data storing section 66, a command information arranging section 68, a screen generating section 70, a command managing section 72, and a display controlling section 74. The program management data storing section 50, command management data storing section 52, and arrangement determination rule data storing section 66 are provided primarily in the storage section 22. The voice receiving section 56 is provided mainly in the input/output section 26. The operation receiving section 54 is provided mainly in the communication section 24 or in the input/output section 26. The display controlling section 74 is provided mainly in the input/output section 26. The other functions are provided mainly in the control section 20.

The above functions are implemented by the control section 20 executing a program that includes the commands corresponding to these functions and is installed in the information processing device 12 as a computer. This program is offered to the information processing device 12 by means of a computer-readable information storage medium such as an optical disk, a magnetic disk, a magnetic tape, a magneto-optical disk or a flash memory, or via communication means such as the Internet.

The program management data storing section 50 stores the program management data shown in FIG. 9 for example.

The command management data storing section 52 stores the command management data shown in FIGS. 10 and 13 for example. The command managing section 72, to be discussed later, updates the command management data according to the display content of the screen in a manner reflecting the executed processes as well as the display content of the screen. For example, when the home screen 30 is displayed, the command management data storing section 52 stores the command management data shown in FIG. 10 for example. When the play screen 42 is displayed, on the other hand, the command management data storing section 52 stores the command management data shown in FIG. 13 for example.

The operation receiving section 54 receives the operations performed on the controller 18. This embodiment causes the operation receiving section 54 to receive signals from the operations of the buttons being pressed, for example.

The voice receiving section 56 receives voices. For example, this embodiment causes the voice receiving section 56 to receive the voices input by the user through the microphones 16*b*.

The voice command identifying section 58 identifies the voice command data represented by the voice received by the voice receiving section 56 in the command management data. In identifying voice command data on the basis of the voice received by the voice receiving section 56, the voice command identifying section 58 in this embodiment identifies the information represented by the received voice using known voice recognition processing techniques. For example, at the time of receiving a voice whose volume falls within a predetermined volume range, e.g., between the lower volume limit L and the upper volume limit H mentioned above, the voice command identifying section 58 in this embodiment identifies that point in time as the start timing for voice command identification. At the time of receiving for a predetermined time period a voice whose volume is lower than the lower volume limit L, the voice command identifying section 58 identifies that point in time as the end timing for voice command identification. The voice command identifying section 58 proceeds to identify the voice command data whose value exactly matches the recognition result of the voice received between the start timing and the end timing of voice command identification. Alternatively, the voice command identifying section 58 may identify the voice command data whose value matches either partially or exactly the recognition result of the voice. As a further alternative, the voice command identifying section 58 may start narrowing down the voice command data candidates for identification when command identification is started. The voice command identifying section 58 may then determine the identified voice command data when command identification is ended. If the volume of the received voice is higher than the upper volume limit H, the voice command data is not identified. The voice command data may be expressed by a phoneme sequence. The voice command identifying section 58 may decompose the voice received by the voice receiving section 56 into phonemes to identify the voice command data represented by the phonemes sequence corresponding to the voice. Also, the voice command identifying section 58 in this embodiment acts as a voice command recognizing section that recognizes a specific voice command, such as the magic word in this case, from the voice data acquired by the voice receiving section 56.

As described above, the voice command identifying section 58 may identify voice command data values that are set in duplicate.

In response to receipt of a voice by the voice receiving section 56, the option identifying section 60 identifies the option of interest and the alternative option from a plurality of options, e.g., from a plurality of program icon images 32 in this embodiment. When the voice command identifying section 58 has identified a plurality of voice command data values, the option identifying section 60 identifies the option of interest and the alternative option from the program icon images 32 associated with these voice command data values as mentioned above. Here, the option identifying section 60 may identify the option of interest and the alternative option on the basis of the attribute values associated with the options, e.g., on the basis of the timings at which the programs corresponding to the options were executed. As another alternative, the option identifying section 60 may identify as the alternative option an option associated with the option of interest as a recommendation to the user.

The command identifying section 62 identifies the command corresponding to the process to be executed on the basis of the voice received by the voice receiving section 56 or the operation received by the operation receiving section 54. The commands in this context are not limited to those corresponding to the command information CI. The commands may also include, among others, a command for changing the information processing device 12 from the voice command input disabled state to the voice command input enabled state.

The process executing section 64 executes various processes such as those corresponding to the commands identified by the command identifying section 62. For example, where the voice received by the voice receiving section 56 represents given command information CI, the processing executing section 64 executes the process corresponding to the command described by the command information. Alternatively, the process executing section 64 may execute processes reflecting the status of ongoing program execution.

The arrangement determination rule data storing section 66 stores arrangement determination rule data for determining the positions, sizes, and content of the command information CI arranged on the screen. FIG. 20 is a tabular view schematically listing typical arrangement determination rule data. In the arrangement determination rule data in FIG. 20, the display content of the screen is associated with the position and size of each voice input guide image 38 arranged on the screen and the content of the command information IC arranged in that voice input guide image 38.

The command information arranging section 68 arranges the command information CI at that position on the screen which corresponds to the display content of the screen. For example, the command information arranging section 68 in this embodiment determines the arrangement of the voice input guide image 38 in which the command information CI is arranged, on the basis of the display content of the screen and the arrangement determination rule data.

As described above, the command information arranging section 68 may have control over whether or not to arrange the command information CI in accordance with the display content of the screen. In this case, if there is the voice command data representing the voice received by the voice receiving section 56, the process executing section 64 may execute the process associated with the voice command data regardless of whether or not the corresponding command information CI is arranged. The command information arranging section 68 may also have control over whether or not to arrange, depending on the display content of the screen, each of the pieces of command information CI corresponding to a plurality of voice command data values. In this case, if the voice received by the voice receiving section 56 represents one of the pieces of command information CI, the process corresponding to the command indicated by that piece of command information CI may be executed.

The command information arranging section 68 may hide a screen area of the display content varying in size with the display content of the screen and arrange the command information CI in that area, as explained above. When the play screen 42 is displayed, the command information arranging section 68 may hide a screen area of the display content smaller than when the home screen 30 is displayed and arrange the command information CI in that area.

The screen generating section 70 generates display screens such as the home screen 30 and the play screen 42. The screen generating section 70 in this embodiment generates the screen at a predetermined frame rate. The screen generating section 70 generates the screen on which the command information CI is arranged as determined by the command information arranging section 68. When the option identifying section 60 has identified the option of interest and the alternative option, the screen generating section 70 generates the home screen 30 on which the option of interest is highlighted and the alternative option information AI indicating the name corresponding to the alternative option is arranged.

The command managing section 72 updates the command management data in the command management data storing section 52 in accordance with the process executed by the process executing section 64 and the screen generated by the screen generating section 70 for example.

The display controlling section 74 outputs to the display unit 14 the data indicating the screen generated by the screen generating section 70. Every time the screen generating section 70 generates a screen at the predetermined frame rate, the display controlling section 74 in this embodiment outputs to the display unit 14 the data indicating the screen. In turn, the display unit 14 displays the screen corresponding to the data. In this manner, this embodiment causes the display unit 14 to display the screen at the predetermined frame rate.

When the option identifying section 60 has identified the option of interest and the alternative option, the display controlling section 74 in this embodiment causes two kinds of information to be displayed, for example: information indicating that the option of interest is being selected, and information representing the voice for identifying the alternative option as the option of interest by the option identifying section 60 in response to receipt by the voice receiving section 56. Specifically, the display controlling section 74 causes display of the information indicating the currently selected option of interest by having the option of interest displayed larger than the other options. Also, the display controlling section 74 causes display of alternative option information AI indicating the name corresponding to the alternative option.

When a specific voice command such as the magic word is recognized during display of a first screen, the display controlling section 74 causes display of a first menu including at least one voice command. When the voice command is recognized during display of a second screen, the display controlling section 74 causes display of a second menu including at least one voice command. In this embodiment, the first screen corresponds to the home screen 30 for example, and the second screen corresponds to the play screen 42 or some other screen generated by the currently executed application program for example. The first menu corresponds to the command information CI arranged on the home screen 30 for example, and the second menu corresponds to the command information CI arranged on the play screen 42 for example. Alternatively, the first screen may be a system menu screen that displays a system menu.

In this embodiment, the first menu and the second menu display their command information CI at different positions, as described above. The second menu may be a subset of the first menu. For example, the command information CI shown on the play screen 42 in FIG. 16 is a subset of the command information CI shown on the home screen 30 in FIG. 14. The first or the second menu may include the command for capturing the display content of the screen as mentioned above.

Figure 21:
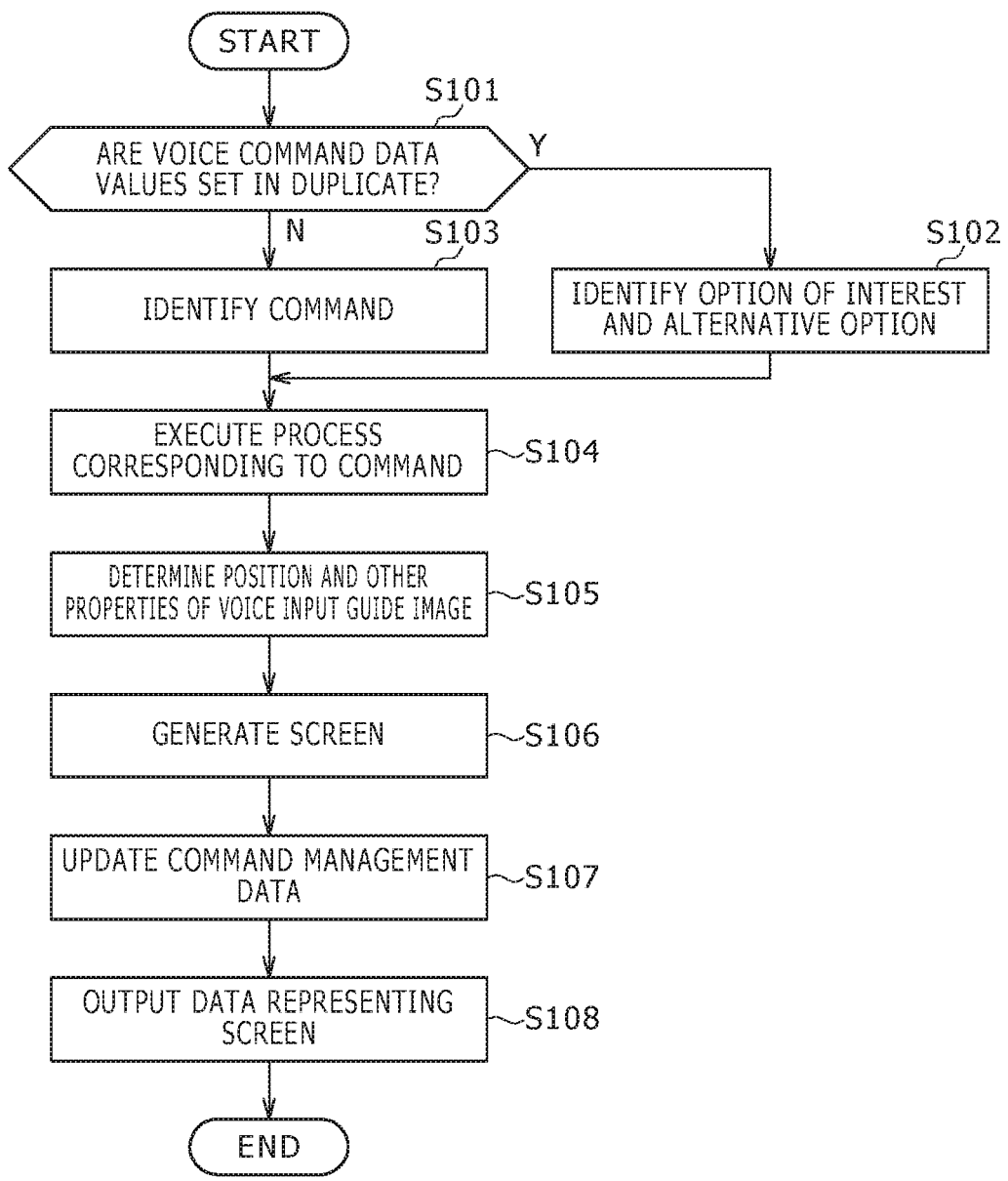
FIG. 21 is a flowchart showing a typical sequence of steps performed by the information processing device in the embodiment.

Described below in reference to the flowchart in FIG. 21 is a typical sequence of steps performed by the information processing device 12 in this embodiment, the sequence being triggered by identification of at least one voice command data value on the basis of the voice received by the voice command identifying section 58.

When the voice command identifying section 58 identifies voice command data, the option identifying section 60 determines in reference to the command management data whether or not the voice command data has voice command data values set in duplicate (S101). If the voice command data is determined to have voice command data values set in duplicate (S101: Y), the option identifying section 60 identifies the option of interest and the alternative option in accordance with predetermined rules (S102). A typical sequence of the process in S102 will be explained later with reference to FIG. 22. If the voice command data is determined not to have voice command values set in duplicate (S101: N), or if the options are identified in the process in S102, the command identifying section 62 identifies the command corresponding to the process to be executed (S103). The process executing section 64 then executes the process corresponding to the command identified in the process in S103 (S104).

The command information arranging section 68 determines the position, size, and content of the voice input guide image 38 on the screen generated as a result of the process in S104 in which the command has been executed (S105). The screen generating section 70 generates a display screen (S106) on the basis of the result of command execution in the process in S104 and of the position, size, and content of the voice input guide image 38 determined in the process in S105. The command managing section 72 updates the command management data in the command management data storing section 52 (S107) on the basis of the execution result in the process in S104 and the screen generated in the process in S106. The display controlling section 74 outputs to the display unit 14 the data indicating the screen generated in the process in S107 (S108). This completes the processing of this example.

Described below with reference to the flowchart in FIG. 22 is a typical sequence of the above-mentioned process in S102.

The option identifying section 60 first identifies the program associated with each of the voice command data values set in duplicate (S201). At this time, the option identifying section 60 may identify, for example, the programs corresponding to the program icon images 32 shown to be selectable as the option of interest and the alternative option out of the process content data in the command management data listed in FIG. 10. The option identifying section 60 then identifies attribute values (S202) associated with each of the programs identified in the process in S201. For example, in the processing example, the last play date and time data of each program is identified in the program management data.

On the basis of the attribute values identified in the process in S202, the option identifying section 60 identifies the program icon images 32 constituting the option of interest and the alternative option (S203). This completes the processing of this example. In this case, the program icon image 32 corresponding to the program having the latest execution timing is identified as the option of interest, and the program icon image 32 corresponding to the program having the second latest execution timing is identified as the alternative option, as discussed above for example.

After the option of interest and the alternative option have been identified as described above, the screen generating section 70 in the process in S106 generates the home screen 30 on which the option of interest is highlighted and the alternative option information AI indicating the name corresponding to the alternative option is arranged.

The present invention is not limited to the embodiment described above.

For example, the information processing device 12 may be a handheld video game machine equipped with the camera 16a and microphone 16b. Alternatively, the information processing device 12 may be a personal computer, a tablet terminal, or a smartphone. The roles played by the information processing device 12, display unit 14, and camera/microphone unit 16 are not limited to those discussed above. As a further alternative, the information processing device 12 may be constituted by a plurality of housings.

The specific character strings in the foregoing description and those in the accompanying drawings are only examples and are not limitative of the present invention.

The invention claimed is:

1. An entertainment device comprising:
a voice receiving section configured to receive plurality of voice inputs from a user;

a command information arranging section configured such that when the voice input represents a prescribed command, the command information arranging section arranges a listing of a plurality of available voice commands at a position on a screen in accordance with a display content of the screen, wherein, when the voice receiving section detects that the voice input from the user corresponds to a first voice command from the plurality of available voice commands, a process is executed according to the first voice command; and a process executing section configured to execute the process corresponding to the first voice command, wherein the command information arranging section has control over whether or not to arrange the listing of the plurality of available voice commands in accordance with the display content of the screen, and regardless of whether or not the available voice command corresponding to the first voice command is displayed, the process executing section executes the process when the voice input voice received by the voice receiving section represents the first voice command.

2. The entertainment device according to claim 1, wherein the listing is only displayed after the prescribed command is received.

3. The entertainment device according to claim 1, wherein one of the plurality of available voice commands represents a for capturing a current screenshot of the display content of the screen.

4. The entertainment device according to claim 1, wherein the command information arranging section hides a screen area of the display content varying in size depending on the display content of the screen and arranges the listing of the plurality of available voice commands in the screen area.

5. The entertainment device according to claim 1, wherein, when a game play screen is displayed, the command information arranging section hides a screen area of a display content smaller than when a screen for selecting the game to play is displayed, and arranges the listing of the plurality of available voice commands in the screen area.

6. A display control method comprising:

receiving a plurality of voice inputs from a user;

when the voice input represents a prescribed command, arranging a listing of a plurality of available voice commands at a position on a screen in accordance with a display content of the screen, wherein, when voice input from the user corresponds to a first voice command from the plurality of available voice commands, a process is executed according to the first voice command; and wherein the listing of the plurality of available voice commands is arranged in accordance with the display content of the screen, and regardless of whether or not the available voice command corresponding to the first voice command is displayed, the process corresponding to the first voice command is executed.

7. A non-transitory computer-readable information storage medium which stores a program for a computer, the program including:

receiving a plurality of voice inputs from a user;

when the voice input represents a prescribed command, arranging a listing of a plurality of available voice commands at a position on a screen in accordance with a display content of the screen, wherein, when voice input from the user corresponds to a first voice command from the plurality of available voice commands, a process is executed according to the first voice command; and wherein the listing of the plurality of available voice commands is arranged in accordance with the display content of the screen, and regardless of whether or not the available voice command corresponding to the first voice command is displayed, the process corresponding to the first voice command is executed.

* * * * *